(12) United States Patent
Shukla

(10) Patent No.: US 12,018,765 B2
(45) Date of Patent: Jun. 25, 2024

(54) VALVE SETUP FOR SMB CHROMATOGRAPHY

(71) Applicant: SARTORIUS STEDIM CHROMATOGRAPHY SYSTEMS LTD., Royston (GB)

(72) Inventor: Dinesh Shukla, Bolton, MA (US)

(73) Assignee: SARTORIUS STEDIM CHROMATOGRAPHY SYSTEMS LTD., Royston (GB)

(*) Notice: Subject to any disclaimer, the term of this patent is extended or adjusted under 35 U.S.C. 154(b) by 229 days.

(21) Appl. No.: 17/738,359

(22) Filed: May 6, 2022

(65) Prior Publication Data

US 2023/0356108 A1 Nov. 9, 2023

(51) Int. Cl.
*F16K 27/02* (2006.01)
*B01D 15/18* (2006.01)
*F16K 31/06* (2006.01)

(52) U.S. Cl.
CPC ...... *F16K 27/0236* (2013.01); *B01D 15/1842* (2013.01); *F16K 31/06* (2013.01)

(58) Field of Classification Search
CPC ... F16K 27/0236; F16K 27/003; G01N 30/32; G01N 2030/328; B01D 15/1842
See application file for complete search history.

(56) References Cited

U.S. PATENT DOCUMENTS

| | | | |
|---|---|---|---|
| 3,554,229 A * | 1/1971 | Coyle | F15C 1/02 137/884 |
| 4,878,815 A * | 11/1989 | Stachowiak | F04B 53/1025 417/454 |
| 4,917,143 A * | 4/1990 | Grooms | F16L 37/144 251/367 |
| 6,076,543 A * | 6/2000 | Johnson | C23C 16/54 137/884 |
| 6,260,581 B1 * | 7/2001 | Hollingshead | F16K 27/003 137/271 |

(Continued)

*Primary Examiner* — Umashankar Venkatesan
(74) *Attorney, Agent, or Firm* — Quinn IP Law

(57) ABSTRACT

An assembly is provided that comprises:
 at least one valve cassette block (20) comprising a plurality of valves (25) which are controllable via a control surface (24) of the valve cassette block (20);
 a valve control block (10) having an operation surface (11), the valve control block (10) being configured to control each of the plurality of valves (25) when the operation surface (11) is in contact with the control surface (24) of the at least one valve cassette block (20), the valve control block (10) comprising at least one sliding trench (14) formed in the operation surface (11);
 at least one sliding component (30) configured to slidably interlock with the at least one sliding trench (14) such that the at least one sliding component (30) is movable relative to the valve control block (10) in a sliding direction parallel to the operation surface (11),
 at least one pulling bracket (40, 50) configured to embrace the at least one valve cassette block (20) and to interact with the at least one sliding component (30) such that a sliding movement of the at least one sliding component (30) in the at least one sliding trench (14) causes the pulling bracket (40, 50) to pull the at least one valve cassette block (20) with its control surface (24) against the operation surface (11) of the valve control block (10).

13 Claims, 7 Drawing Sheets

(56) References Cited

U.S. PATENT DOCUMENTS

| | | | |
|---|---|---|---|
| 6,874,538 B2* | 4/2005 | Bennett | F16K 27/003 |
| | | | 137/884 |
| 7,554,293 B2* | 6/2009 | Horigome | H02J 7/0048 |
| | | | 320/132 |
| 9,080,679 B2* | 7/2015 | Kuhbauch | F16K 27/003 |
| 9,096,931 B2* | 8/2015 | Yednak, III | C23C 16/45512 |
| 11,215,309 B2* | 1/2022 | Sasaki | H05B 3/06 |
| 2004/0178674 A1* | 9/2004 | Lohberg | B60T 17/18 |
| | | | 303/119.3 |
| 2006/0011246 A1* | 1/2006 | Leys | F17D 1/04 |
| | | | 137/884 |
| 2008/0053543 A1* | 3/2008 | Baier | G01N 30/20 |
| | | | 137/625.25 |

* cited by examiner

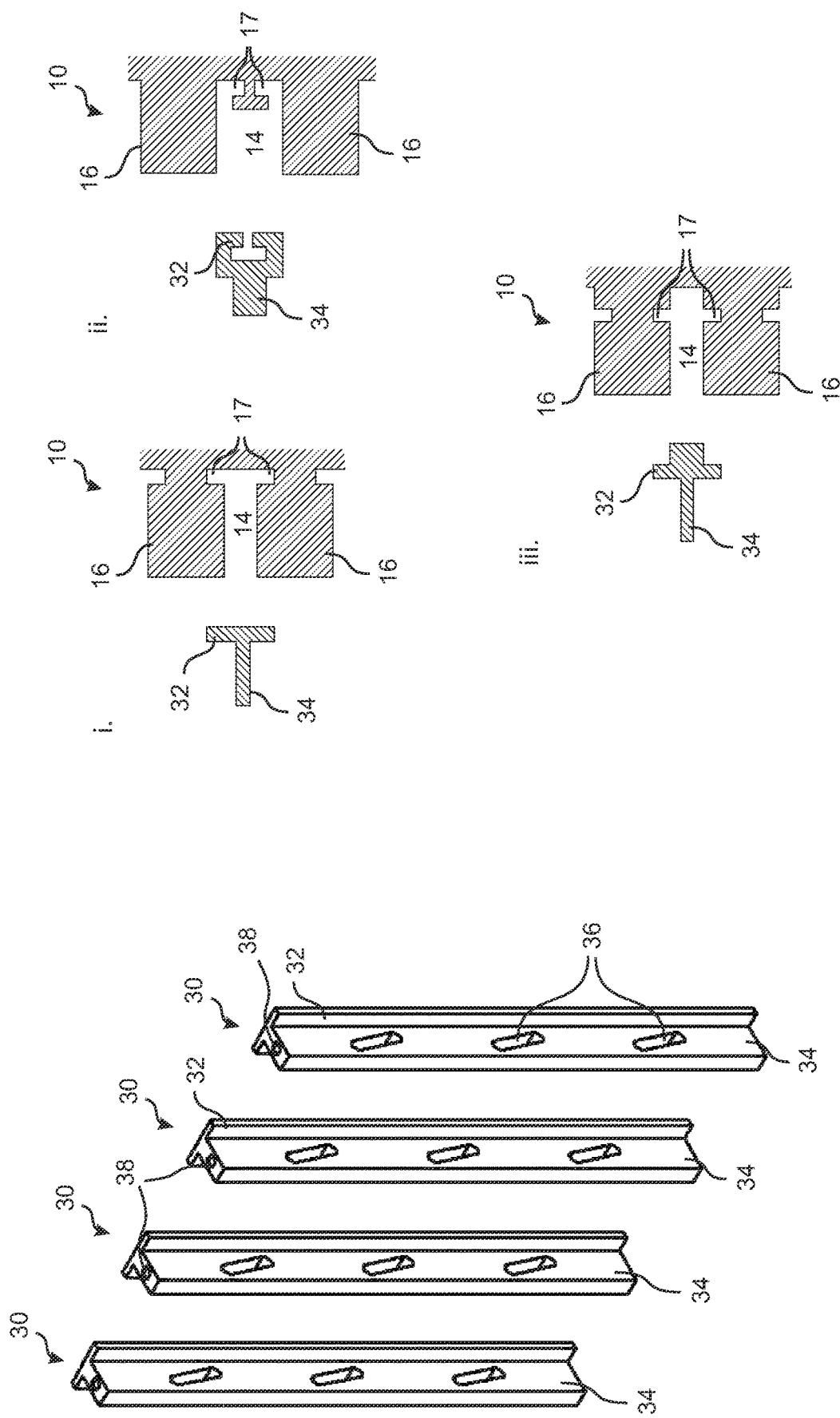

VALVE SETUP FOR SMB CHROMATOGRAPHY

BACKGROUND

Biopharmaceutical or pharmaceutical production involves the purification of solutions from which active pharmaceutical ingredients (API) are extracted. These solutions, also known as feeds, can be produced chemically-synthetically or biologically-organically. The feed comprises a plurality of components that need to be separated from each other, e.g. one or more target components and impurities. Chromatography is a technique used to perform this separation process.

One implementation of chromatography for separating two components is the simulated moving bed (SMB). An SMB system comprises a plurality of columns connected in series or in parallel, two inlets (one for the feed and one for the buffer) and two outlets (one for each component of the feed). The position of the inlets and the outlets is moved at regular intervals in a given direction to simulate a movement of the columns in the opposite direction. The switching of the position of the inlets and outlets requires a set of valves suitably controlled.

The BioSMB systems by Sartorius® for SMB chromatography include a valve setup comprising two separate blocks: a valve control block that regulates the switching of the valves and a valve cassette block that comprises the plurality of valves. The valve cassette block is the only component that comes in contact with the fluids, and can be conveniently replaced after every use in order to avoid a cumbersome cleaning process.

The connection between the control block and the valve cassette block needs to be airtight. Conventionally, the valve cassette block is pressed against the control block using a plurality of screws and washers tightened in a predetermined sequence, e.g. first at 2 Nm and then at 3.5 Nm. This procedure requires a calibrated torque wrench and a long installation time (about 45 minutes).

Another conventional method for securing the valve cassette block to the control block is the use of a swivel door with an array of hydraulic cylinders, which apply the required sealing pressure. This procedure involves a very complex design and high costs.

SUMMARY

According to one aspect, a valve setup or assembly is provided that comprises:
  at least one valve cassette block comprising a plurality of valves which are controllable via a control surface of the valve cassette block;
  a valve control block having an operation surface, the valve control block being configured to (selectively) control (e.g. open and close) each of the plurality of valves when the operation surface is in close contact with the control surface of the at least one valve cassette block, the valve control block comprising at least one sliding trench formed in the operation surface;
  at least one sliding component configured to slidably interlock (i.e. engage) with the at least one sliding trench such that the at least one sliding component is movable relative to the valve control block in a (specifically only in one) sliding direction parallel to the operation surface, the sliding direction being defined as the length direction of the sliding trench,
  at least one pulling bracket configured to embrace the at least one valve cassette block and to interact with the at least one sliding component such that a sliding movement of the at least one sliding component in the at least one sliding trench (relative to the valve control block and the at least one pulling bracket in the sliding direction) causes the at least one pulling bracket to pull the at least one valve cassette block with its control surface against the operation surface of the valve control block.

The valve control block might even comprise a plurality of sliding trenches formed in the operation surface. The assembly may further comprise a plurality of sliding components each being configured to slidably interlock with a respective sliding trench (such that each sliding component is movable relative to the valve control block in a (respective) sliding direction parallel to the operation surface). The sliding components might all be movable parallel to each other (i.e. in the same sliding direction). In one example, the multiple sliding trenches may be formed parallel to each other and they may even be at least partially equidistant to each other. Moreover, the assembly may also comprise a plurality of pulling brackets each being configured to embrace the at least one valve cassette block and to interact with a respective one of the sliding components such that a sliding movement of the respective sliding component in the respective sliding trench (relative to the valve control block and the pulling bracket along the respective sliding direction) causes the respective pulling bracket to pull the at least one valve cassette block with its control surface against the operation surface of the valve control block.

The at least one sliding component may comprise two lateral shoulders as an implementation of an interlocking structure of the sliding component, wherein the shoulders may be adapted to engage with respective undercut recesses formed in the respective sliding trench of the valve control block. Alternatively, other geometries of interlocking structures of the sliding components may be used as explained further below.

In any case, the sliding component(s) might engage with the sliding trench(es) such that in the engaged state the sliding component(s) is/are movable relative to the valve control block along the sliding direction. In particular, the engagement might prevent or at least restrict a movement of the sliding component(s) relative to the valve control block in a direction perpendicular to the operation surface. Therefore, the sliding component can receive and transmit pulling forces between the valve control block and the valve cassette block in a direction perpendicular to the operation surface, i.e. the pulling direction.

The pulling bracket(s) may be limited in its movement along the sliding direction relative to the valve control block, such that a sliding movement of the sliding component(s) in the sliding trench(es) along the sliding direction leads to a relative movement between the sliding component(s) and the respective pulling bracket(s). In the assembled state (i.e. in operation), the sliding component(s) and the respective pulling bracket(s) is/are movable coupled via a tightening mechanism that implements the interaction that causes the pulling bracket to pull the at least one valve cassette block towards the valve control block upon sliding movement of the sliding component. In other words, the tightening mechanism translates the sliding movement of the sliding component in the sliding direction into a movement of the pulling bracket in the pulling direction, i.e. perpendicular to the operation surface of the valve control block.

The at least one sliding component may comprise a ridge, wherein the ridge includes part of the tightening mechanism that implements the interaction between the sliding component and the pulling bracket. In an example, the at least one pulling bracket may comprise a U-beam which is configured to at least partly accommodate the ridge of the respective sliding component and which may include a complementary part of said tightening mechanism that implements said interaction between the sliding component and the pulling bracket.

Moreover, the tightening mechanism may be implemented such that one of the sliding component and the pulling bracket includes a gliding surface slanted relative to the sliding direction (and the pulling direction), while the other of the sliding component and the pulling bracket includes or accommodates an abutting element to glidingly abut the slanted gliding surface. The relative movement of the sliding component and the pulling bracket causes the abutting element to glide along in the direction of the slant of the gliding surface such as to cause a pulling force between the sliding component and the pulling bracket that pulls the valve cassette block with its control surface against the operation surface of the valve control block. In other words, the slanted gliding surface together with the abutting element translates the sliding movement of the sliding component into a movement of the pulling bracket perpendicular to the operation surface of the valve control block.

The assembly may further comprise a tensioning screw to control a forced sliding movement of the sliding component relative to the valve control block in the sliding trench, when the pulling bracket interacts with the sliding component, thereby causing the operation surface of the valve control block embraced by said pulling bracket to be tightly pulled against the control surface of the valve cassette block.

The at least one pulling bracket (or each pulling bracket of a plurality of pulling brackets) may comprise a bridge bar, a plurality of tension bars, and an embracing yoke. The bridge bar may be configured to be engaged with the at least one sliding component. Each of the plurality of tension bars may be connected with a first end thereof to the bridge bar and the plurality of tension bars may extend perpendicular to the bridge bar and substantially parallel to each other. The embracing yoke may be removably attachable to second ends of the plurality of tension bars, thereby connecting said second ends of the tension bars.

Thereby, the valve cassette block can be easily and efficiently embraced between the bridge bar and the embracing yoke with the tension bars connecting the bridge bar and the embracing yoke and holding them together. Specifically, in operation, the bridge bar may be directly engaged (interact) with the respective sliding component to be pulled towards the valve control block upon movement of the sliding component. The tension bars may extend from the bridge along the pulling direction and transmit the pulling force to the embracing yoke. The embracing yoke may embrace and support the valve cassette block on its surface opposite to the control surface, i.e. the holding surface. Thereby, the embracing yoke(s) can mechanically support the valve cassette block (at the holding surface), while pushing against the holding surface towards the valve control block. This allows the valve setup to be easily assembled and disassembled while being reliably kept together during operation with an adequately even distribution of forces exerted to the valve cassette block.

The at least one pulling bracket may particularly comprise at least three tension bars, and the at least one valve cassette block may comprise at least one embracing through-slot extending through the control surface to an opposite side of the valve cassette block such that at least one of the at least three tension bars can extend through the embracing through-slot when the pulling bracket embraces the valve cassette block. This might support the pulling force to be more evenly distributed over the valve cassette block.

The assembly may further comprise a displacement prevention structure that prevents relative movement of the valve cassette block and the valve control block with respect to each other in at least the sliding direction (defined by the sliding trench) when the control surface and the operation surface face each other or touch each other. This might ensure correct relative placement of the control surface and the operation surface face with respect to each other for reliably operation of the plurality of valves and it also avoids or reduces lateral forces between the control surface and the operation surface while moving the sliding component when tightening the connection between the control surface and the operation surface. This might not only ensure proper operation but might also avoid or reduce the risk of damage (e.g. of sensitive membranes at the control surface). In one example, the displacement prevention structure may comprise at least one protruding portion formed in one of the valve cassette block and the valve control block and at least one mating recess formed in the other of the valve cassette block and the valve control block.

According to another aspect, a method for assembling a valve setup is provided. The method comprises:
  providing at least one valve cassette block comprising a plurality of valves which are controllable via a control surface of the valve cassette block;
  providing a valve control block having an operation surface, the valve control block being configured to (selectively) control (e.g. open and close) each of the plurality of valves when the operation surface is in contact with the control surface of the at least one valve cassette block;
  slidably interlocking at least one sliding component with at least one sliding trench formed in the operation surface of the valve control block such that the at least one sliding component is movable relative to the valve control block in a (particularly only in one) sliding direction parallel to the operation surface;
  embracing the at least one valve cassette block with at least one pulling bracket;
  engaging the at least one pulling bracket with the at least one sliding component such that a (sliding) movement of the at least one sliding component in the at least one sliding trench (relative to the valve control block and the pulling bracket) causes the at least one pulling bracket to pull the at least one valve cassette block with its control surface against the operation surface of the valve control block;
  tightening the valve setup by sliding the at least one sliding component in the at least one sliding trench such as to cause the at least one valve cassette block with its control surface to be pulled (urged) against the operation surface of the valve control block.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

FIG. 4a shows a plurality of exemplary sliding components.

FIG. 4b shows different examples of cross-sections for sliding component and corresponding sliding trenches.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

The following description relates to an assembly that constitutes a valve setup for use in a SMB chromatographic separation process. The chromatographic separation process may be performed exemplarily to purify recombinant protein products, or monoclonal antibodies, or viral vectors, or DNA products.

Figure 1:
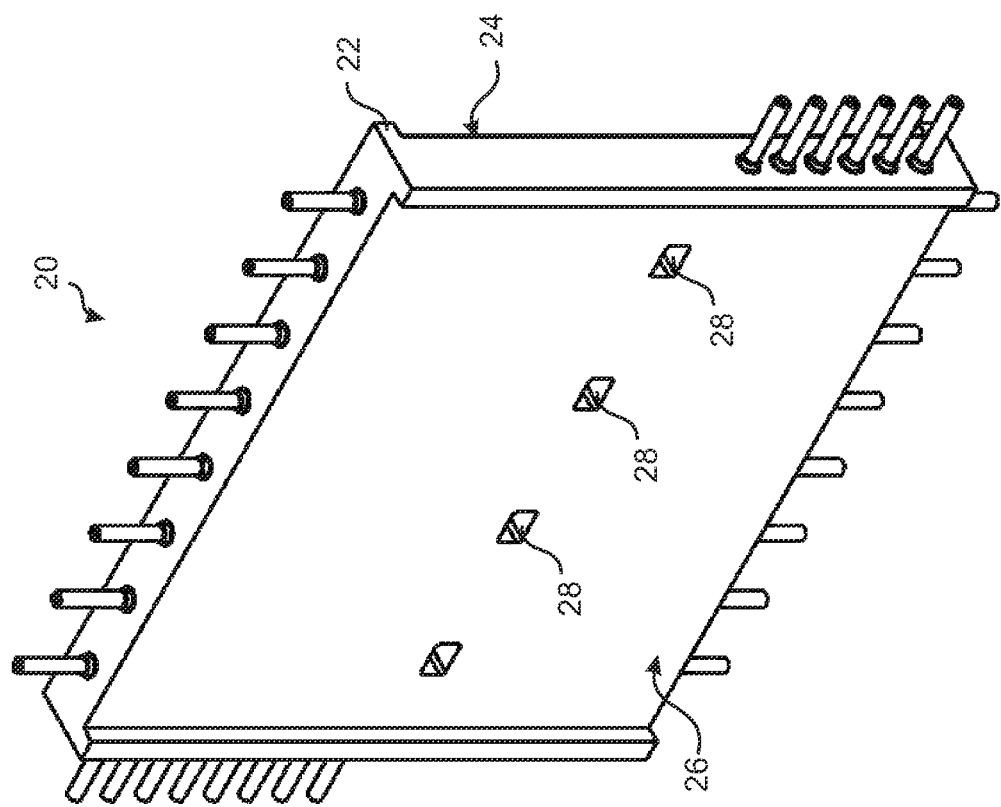
FIG. 1 shows an example of a valve cassette block.

The assembly comprises two blocks, a valve cassette block (or "valve cassette") comprising a plurality of valves and a valve control block that controls the plurality of valves. FIG. 1 shows an example of a valve cassette block 20 and FIG. 2 shows an example of a valve control block 10.

The valve cassette block 20 comprises a plurality of valves 25 (not visible in FIG. 1 but visualized in FIG. 3a), e.g. membrane or diaphragm valves. The valves 25 are accessible for being controlled (e.g. switched between an open and a closed state, or between a connected and disconnected state, or even switched between three or more different valve states per valve) via a control surface 24 of the valve cassette block 20. In the example of FIG. 1, the control surface 24 is on the far side, opposite to a holding surface 26 of the valve cassette block 20. The plurality of valves might be arranged in a regular array along the control surface 24. Each of the valves might be addressed (controlled) separately from the other valves, for example.

The valve control block 10 comprises a plurality of control elements 15 arranged at an operation surface 11 of the valve control block 10 for controlling the valves 25 in the valve cassette block 20, for example a plurality of solenoids, wherein each solenoid is configured to control (e.g. open/close) a respective valve 25, when the control surface 24 of the valve cassette block 20 is in close contact with the operation surface 11 of the valve control block 10. Accordingly, the valve cassette block 20 may comprise n valves 25 and the valve control block 10 may comprise n control elements 15, e.g. including solenoids. The plurality of control elements 15 may be arranged in a regular array corresponding to the regular array of the plurality of valves, such that each control element 15 is placed next to a corresponding valve 25 and can control that valve when the control surface 24 is in close contact with the operation surface 11 in a mounted state of the assembly.

Figure 2:
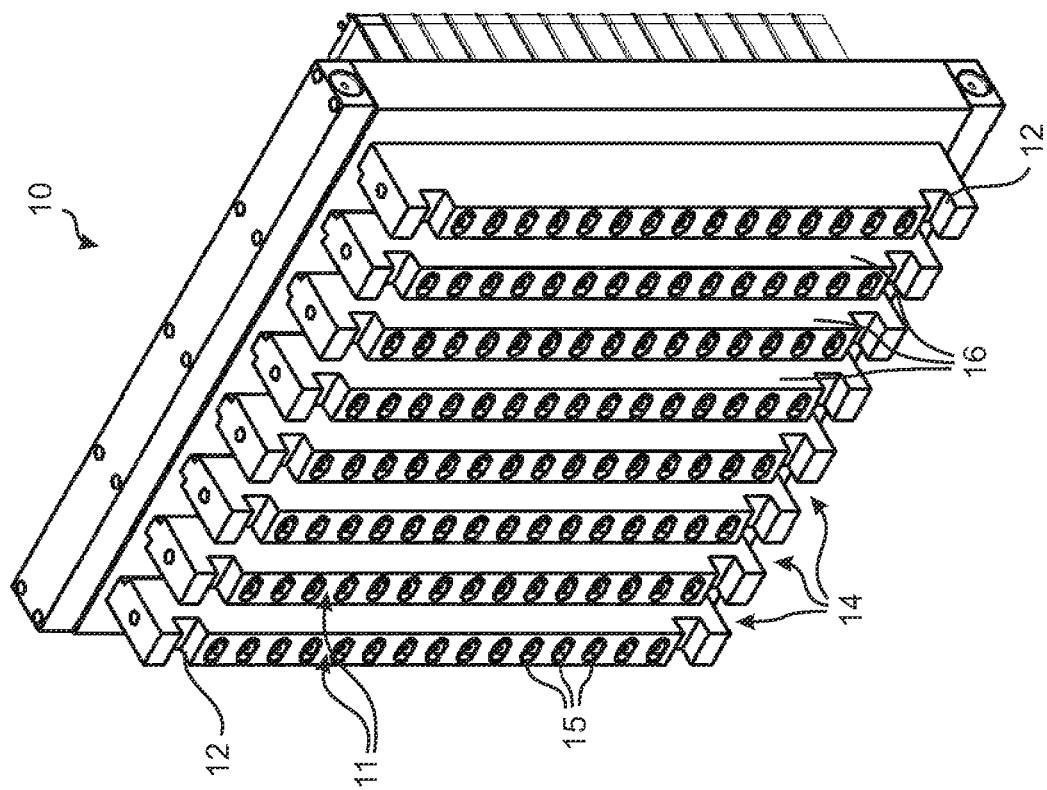
FIG. 2 shows an example of a valve control block.

In the example shown in FIG. 2, the valve control block 10 comprises a plurality of parallel sliding trenches 14 formed in the operation surface 11. The sliding trenches 14 are configured to interlock with respective sliding components as will be explained further below. In particular, the sliding trenches 14 may be receding with respect to a plane formed by the operation surface 11 at which the control elements 15 are located. As shown in FIG. 2, the sliding trenches 11 may be (regularly) arranged in parallel (e.g. equidistant) to each other such that they (partly) separate parallel control block banks 16 that form the portions of the operation surface 11 between the plurality of sliding trenches 14.

The control elements 15 may be implemented in one or more of the control block banks 16, i.e. between the sliding trenches 14. In this respect, each of the control block banks 16 or only part (i.e. one or more) of the control block banks 16 may comprise one or more of the control elements 15. Those control block banks 16 that comprise one or more control elements 15 may each have a surface forming part of the operation surface 11 and preferably lying in a common plane. Further exemplary details concerning the plurality of sliding trenches 14 and the plurality of control block banks 16 will be discussed with reference to FIGS. 4a and 4b below.

The plurality of valves 25 may be located on a substantially flat surface of the valve cassette block 20, e.g. on the "hidden" face in FIG. 1. The arrangement of the valves 25 on the valve cassette block 20 may conform to the arrangement of the control elements 15 on the valve control block 10 so that it is possible to bring each valve in correspondence of its respective control element 15 when placing the valve cassette block 20 next to the valve control block 10. Exemplarily, the plurality of valves 25 (and, similarly, the control elements 15) may be arranged according to an array along rows and columns.

Figure 3A:
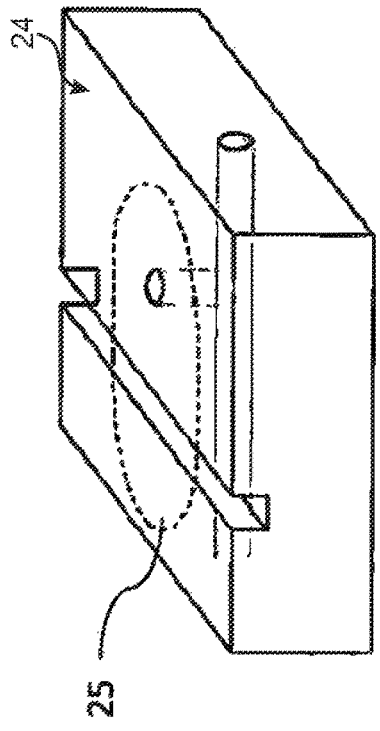
FIG. 3a shows a portion of an exemplary valve cassette block comprising a valve and channels.

The valve cassette block 20 may comprise a plurality of channels that may be connected or disconnected by actuating the valves 25. FIG. 3a shows a cut-out portion of the valve cassette block 20 comprising a membrane valve 25 and two channels in orthogonal directions to each other. The structure of the valve cassette block 20 may comprise a plurality of portions such as the one shown in FIG. 3a, in order to provide a manifold of valves 25 and interconnectable conduits that form a flow path. The valve cassette block 20 may comprise inlet and outlet connectors for connecting to external components, e.g. chromatography columns or membrane devices or collection vessels. Exemplarily, the valve cassette block 20 may be a unitarily formed block, made of e.g. plastic such as acrylic resin.

Figure 3B:
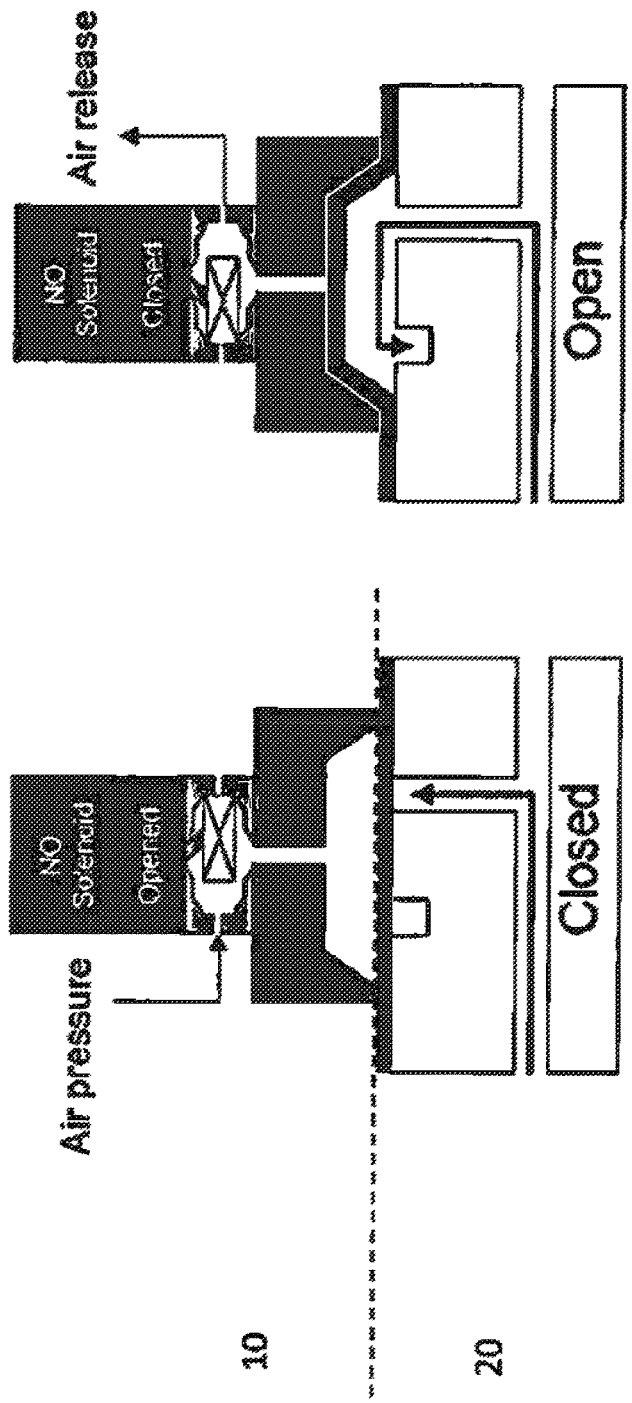
FIG. 3b shows a functioning of an exemplary valve.

FIG. 3b shows a functioning of an exemplary membrane valve 25 in the valve cassette block 20 controlled by a corresponding solenoid in the valve control block 10. In particular, the valve control block 10 may further comprise a plurality of air chambers, each associated to a corresponding solenoid, so that the solenoid acts as pneumatic actuator for the corresponding valve 25. An air chamber may comprise one or more cavities, e.g. one cavity on the surface of the valve control block 10 configured to receive the membrane valve. The air chamber may further comprise a cavity with an inlet and an outlet for air passage.

For example, the solenoid may be a normally open (NO) solenoid, which implies that the membrane valve is normally closed (left-hand side of FIG. 3b). When the solenoid switches from open to closed, it removes the air pressure on the membrane valve, which then opens, connecting the conduits in the valve cassette block 20 (right-hand side of FIG. 3b). It is also possible to construct the valve block that houses miniature air or hydraulically operated plungers (or fingers) that apply mechanical force on the valve membrane to close the valve or release the force to open the valve (by media fluid pressure on the cassette side or a physical connection of the membrane to the actuator plungers pulling the valve open). Alternatively, plungers designed using electromagnetic latch solenoids or piezoelectric actuators may also be used.

In other words, the valve control block 10 and the valve cassette block 20 cooperate to switch flow paths and, thus, connections to inlets for feed and solvent as well as outlets. The valve control block 10 and valve cassette block 20 are formed separately and subsequently mechanically joined. One advantage of this configuration is that the valve control block 10 may be a permanent component of the chromatography system and the valve cassette block 20 may be a single-use component.

The dashed line on the left-hand side of FIG. 3b shows the interface between the valve control block 10 and the valve cassette block 20. In order to ensure a correct functioning of the valve setup, it can be desirable that the valve control block 10 and the valve cassette block 20 are in airtight contact with each other and that the valves 25 of the valve cassette block 20 are accurately positioned in correspondence of the control elements (e.g. solenoids and air chambers) in the valve control block 10.

To this purpose, the valve setup may comprise a combination of sliding components and pulling brackets as described in the following.

FIG. 4a shows a plurality of exemplary sliding components 30, wherein the sliding components 30 may be all identical. The plurality of sliding components 30 are configured to be slidably interlocked with at least some sliding trenches 14 of the plurality of sliding trenches 14 of the valve control block 10, wherein each sliding component 30 is configured to be slidably interlocked with a respective sliding trench 14. In other words, each sliding component 30 is configured to engage a respective sliding trench 14 such that the sliding component 30 can move along a given direction (the sliding direction parallel to the operation surface) but it is fixed/guided along the other directions.

Generally, the number of sliding components 30 may be lower than or equal to the number of sliding trenches 14. Accordingly, while every sliding component 30 is accommodated in a sliding trench 14, not every sliding trench 14 may accommodate a sliding component 30. In the examples shown in FIGS. 1 and 4, the valve control block 10 comprises seven sliding trenches 14 and the plurality of sliding components 30 comprises four sliding components 30. In this case, every other sliding trench 14 may engage a sliding component 30. In other examples, the number of sliding trenches 14 and sliding components 30 may vary.

The shape and dimensions of the sliding components 30 and of the sliding trenches 14 may at least partly correspond to each other, so each sliding component 30 can be interlocked with its respective sliding trench 14. In particular, the cross section of a sliding component 30 in the plane perpendicular to the sliding direction may have a shape and dimensions that at least partly match the corresponding cross section of the sliding trench 14. Since a sliding trench 14 is empty space (or negative space) defined by adjacent control block banks 16, the cross section of the sliding component 30 may have a shape that is at least partly complementary to the shape of the cross sections of the control block banks 16.

As shown in the example of FIG. 4a, each sliding component 30 may comprise a ridge 34 and two lateral shoulders 32 (as an implementation of an interlocking structure of the sliding component) that form together a substantially T-shaped cross section (at least over most of its extension along the sliding direction) perpendicular to the sliding direction. The shoulders 32 may be adapted to engage with respective undercut recesses 17 formed in the respective sliding trench 14 (see FIG. 4b).

Each sliding component 30 may be considered as comprising an interlocking part 32 (such as the lateral shoulders 32), which is configured to engage with the valve control block 10, while the ridge 34 is configured to engage with the pulling brackets, as discussed below. In particular, the interlocking part 32 may have both shape and dimensions matching (i.e. being substantially identical to) those of the sliding trench part with which it engages, in order to ensure a stable interlocking. The ridge 34, which is also accommodated in the sliding trench 14 as explained in more detail below, may have different dimensions and possibly also a different shape with respect to the sliding trench.

FIG. 4b shows three different examples of cross-sections for a sliding component 30 and for control block banks 16. The cross-sections are in the plane perpendicular to the sliding direction. This plane is parallel to the pulling direction. These examples are merely illustrative in purpose and are not to scale.

In example (i), the sliding component 30 has a T-shaped cross section, which matches the T-shaped cross section of the sliding trench 14 formed by control block banks 16. Alternative examples (ii) and (iii) are illustrated in FIG. 4b as well. The cross sections shown in FIG. 4b are merely few examples of interlocking structure with corresponding/mating shapes. Further examples may include cross-shaped cross sections, curved cross sections and other additional shapes.

More generally, each sliding trench 14 and, correspondingly, each sliding component 30 may have a varying width along the direction (the pulling direction) perpendicular to the operation surface, wherein the width may change stepwise, as in examples (i) to (iii), or gradually. The varying width may create a "bottleneck" so that, once the sliding component 30 is inserted in the sliding trench 14, the sliding component 30 is fixed along the pulling direction.

Accordingly, a plurality of sliding components 30 can be slidably interlocked with the plurality of sliding trenches 14 of the valve control block 10, thereby fixing the sliding components 30 and the valve control block 10 to each other.

Going back to FIG. 4a, each sliding component 30 may comprise a ridge 34, as mentioned. The ridge 34 may include part of a tightening mechanism (like first through-slots 36 across the width of the ridge) that implements an interaction between the sliding component 30 and a pulling bracket (described further below) such that a sliding movement of the sliding component 30 in the sliding trench 14 relative to the pulling bracket causes the pulling bracket (40, 50) to pull the valve cassette block (20) with its control surface (24) against the operation surface (11) of the valve control block (10).

In this example, each ridge 34 comprises a plurality of first through-slots 36 across the width of the ridge 34 and a threaded hole 38 with a depth along the sliding direction. The threaded hole 38 is configured to receive a tensioning screw of a plurality of tensioning screws 75 (shown e.g. in FIG. 7). The threaded hole 38 may, in particular, be a blind hole.

The first through-slots 36 may be slanted through-slots or fitted through-slots, as will be discussed below. Each first through-slot 36 is configured to receive a pin, such as a dowel pin. Exemplarily, each ridge 34 may comprise three first through-slots 36. In other examples, each ridge may comprise two or more than three first through-slots 36.

Figure 5:
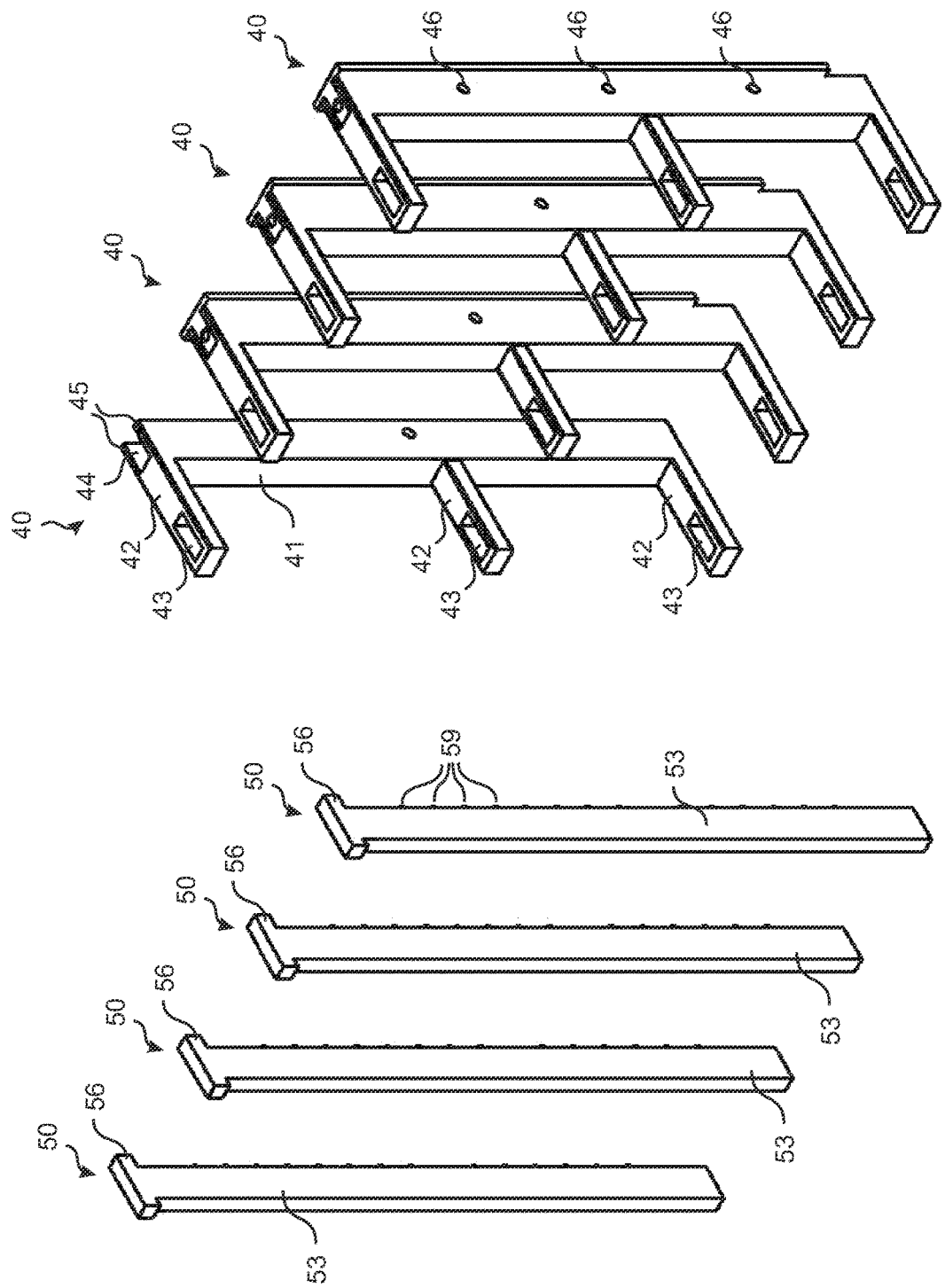
FIG. 5 shows a plurality of exemplary pulling brackets.

The plurality of the sliding components 30 is configured to engage with a plurality of pulling brackets. FIG. 5 shows a plurality of exemplary pulling brackets, each being composed of a brace component 40 and an embracing yoke 50. Exemplarily, the pulling brackets may all be identical. The plurality of pulling brackets is configured to embrace and hold the valve cassette block 20 such that the valve cassette block 20 and the plurality of pulling brackets form a rigid body. In other words, the plurality of pulling brackets may be configured to hold the valve cassette block 20 such that the valve cassette block 20 does not move relative to the plurality of pulling brackets. The combination of the pulling brackets and the valve cassette block 20 may be referred to as "cassette subassembly".

The pulling brackets and the valve cassette block 20 are configured to be joined so that they do not move with respect to one another and, instead, they behave as a single, rigid body even under the application of (pulling) forces. This means, for example, that, if the plurality of pulling brackets is pulled towards the valve control block, the valve cassette block 20 is dragged along and pulled by substantially the same amount.

Each pulling bracket (specifically its brace component 40) may comprise a bridge bar 41 and a plurality of tension bars 42 extending perpendicular to the bridge bar 41. In particular, the tension bars 42 may be connected with first ends thereof to the bridge bar 41 and may extend perpendicular to the bridge bar 41 and substantially parallel to each other. They may even be equidistant from each other within one/each pulling bracket. In particular, one tension bar 42 (outer tension bar) may be provided at each end of the bridge bar 41 such that the tension bars (outer tension bars) at the ends of the bridge bar 41 may embrace the valve cassette block outside its peripheral edge. For any tension bar (inner tension bar) between these outer tension bars, the valve cassette block may have provided a respective embracing through-slot 28 such that the inner tension bar(s) extend through the valve cassette block.

In the examples shown in the figures, each pulling bracket comprises an embracing yoke 50 removably attachable to second ends of the plurality of tension bars 42, thereby connecting said second ends of the tension bars 42. For example, each tension bar 42 may comprise at its second end an opening 43 (through-slot) configured to receive a respective embracing yoke. Each embracing yoke 50 may comprise a body 53 and a stopping element 56. The body 53 may be a straight bar. Each embracing yoke 50 may be configured to be inserted through the openings 43 (of the tension bars 42) of a respective brace component 40 so as to be substantially parallel to the bridge bar 41 of the respective brace component 40. In particular, the shape and dimensions of the embracing yoke 50 may match the shape and dimensions of the openings 43. The stopping element 56 may be configured to maintain the embracing yoke 50 in a fixed position once it has been inserted in the openings 43.

Accordingly, a brace component 40 and an embracing yoke 50 can be joined by sliding the embracing yoke 50 in the openings 43 of the brace component 40 to form a closed frame for the valve cassette block 20. The plurality of brace components 40 and the plurality of embracing yokes 50 may form together a "rib cage" that can encase the valve cassette block 20. Thus, the valve cassette block 20 may be sandwiched between the pulling components 40 and the embracing yokes 50, in what may be referred to as the "assembled state".

Exemplarily, each embracing yoke 50 may have a plurality of protrusions 59 on the side configured to face and come into contact with the valve cassette block 20. The position of the plurality of protrusions 59 on the enclosing component 50 may be such that, in the assembled state, each protrusion 59 may be in contact with an area on the side of the valve cassette block 20 that is in correspondence of one of the valves 25 on the other side of the valve cassette block 20. The presence of the plurality of protrusions 59 may help to distribute forces more homogeneously.

In the examples in which each brace component 40 cooperates with an embracing yoke 50, the plurality of tension bars 42 may comprise only two tension bars at the ends of the bridge bar 41 (denoted as "outer tension bars" in the following). Accordingly, each brace component 40 may have a C-shape.

Alternatively, the plurality of tension bars 42 may comprise two outer tension bars and one or more inner tension bars, positioned between the outer tension bars. The example of FIG. 5 shows brace components 40 each comprising one inner tension bar, so that each brace component 40 has an E-shape. Other examples may comprise two or more inner tension bars. The tension bars 42 may be equidistant from each other along the brace component 40 or may have different distances from each other.

In the case of one or more inner tension bars, the valve cassette block 20 may comprise a plurality of embracing through-slots 28 (see FIG. 1) for inserting the inner tension bars to extend through the valve cassette block in the pulling direction. Accordingly, the valve cassette block 20 and the plurality of pulling brackets 40, 50 may in particular be joined by making the inner tension bars pass through the plurality of embracing through-slots 28. If each pulling bracket 40, 50 comprises n inner tension bars and there are m pulling brackets 40, 50 for one valve cassette block, the valve cassette block 20 may comprise at least n×m embracing through-slots 28. The presence of one or more inner tension bars may support to distribute forces more homogeneously.

To summarize, the pulling brackets 40, 50 and the valve cassette block 20 are configured to be joined to each other so as to form a subassembly that can be connected to the valve control block 10 by means of the sliding components 30, which are engageable with the pulling brackets 40, 50, for example with their respective bridge bars 41. In other examples, the pulling brackets may not have bridge bars, and instead tension bars may be directly engageable with the sliding components.

Indeed, as shown in FIG. 5, the bridge bar 41 of each brace component 40 comprises a U-beam which is configured to at least partly accommodate the ridge 34 of a respective sliding component 30. Specifically, the U-beam exhibits a slit 44 formed between two side flanges 45. The slit 44 is configured to receive a respective ridge 34 of a sliding component 30. The slit 44 may extend along the whole length of the bridge bar 41. The length of the slit may be substantially identical to or longer than the length of the ridge 34 of a sliding component 30.

Each pulling bracket comprises part of the tightening mechanism complementary to the part of the tightening mechanism implemented in the respective sliding component 30. Thus, this complementary part of the tightening mechanism contributes to implementing the interaction between the sliding component 30 and the pulling bracket 40, 50 such that a sliding movement of the sliding component 30 in the sliding trench 14 relative to the pulling bracket causes the pulling bracket 40, 50 to pull the valve cassette block 20 with its control surface 24 against the operation surface 11 of the valve control block 10.

In this example illustrated in the figures, as said complementary part of the tightening mechanism each side flange 45 comprises a plurality of second through-slots 46 across its width (perpendicular to the sliding direction and the pulling direction), which may be slanted through-slots or fitted through-slots, as discussed further below. Each second through-slot 46 is configured to receive a pin, such as a dowel pin 60. The number of second through-slots 46 in each single side flange 45 may be identical to the number of first through-slots 36 in a ridge 34.

The second through-slots 46 in one side flange 45 of a pulling component 40 are located in correspondence of the second through-slots 46 in the other side flange 45. In other words, the second through-slots 46 form pairs of facing or opposing holes. Further, the position of the second through-slots 46 on each pulling component 40 and of the first through-slots 36 on each sliding component 30 is such that, when the ridge 34 is inserted in the slit 44, each first through-slot 36 overlaps at least partially with two second through-slots 46. In other words, the position of the first and second through-slots 36, 46 is such that the first and second through-slots 36, 46 can be at least partially aligned with each other.

Accordingly, an assembled combination of a pulling bracket and a sliding component also has through-slots across its width. In order to complete the implementation of the tightening mechanism, the plurality of pins 60 is provided where the pins are configured to pass through respective first through-slots 36 and respective second through-slots 46, and thereby transmitting the interaction between the sliding component 30 and the pulling bracket 40, 50. Thus, the pins 60 are configured to join a pulling bracket 40, 50 with its respective sliding component 30 when inserted in the through-slots. In this configuring either the first through-slots 36 or the second through-slots 46 are slanted through-slots such that the sliding component 30 and the pulling bracket 40, 50 are still partly movable relative to each other in the sliding direction, i.e. parallel to the ridge 34.

A fitted through-slot has a shape and dimensions that substantially match the shape and dimensions of the cross section of a pin 60 in the plane perpendicular to the direction along which the pin 60 is inserted in the through-slot. A slanted through-slot, instead, is an elongated through-slot oriented obliquely in such plane. Specifically, a slanted through-slot has a cross section (e.g. in a plane parallel to the pulling direction and parallel to the sliding direction) with a long axis of extension and a short axis of extension. The long axis of extension is greater than the corresponding dimension of the pin 60, such that the pin 60 can move within the slanted through-slot along the long axis of extension while guided by the slanted through-slot. In one example, the elongated cross section of the slanted through-slot may have an aspect ratio (ratio between long and short extension) of 5 or more. The extension of the slanted through-slot along its short axis may correspond to the thickness of a pin 60.

The direction of the long axis of extension may be considered as oblique direction. This oblique direction, i.e. the extension of the slanted through-slot along its long axis of extension, encloses an angle (slanting angle) relative to the sliding direction different from zero and different from 90°. In one aspect that slanting angle may be at least about 5°, optionally at least about 10°. In a further aspect, the slanting angle may be not more than about 20°, optionally not more than about 15°.

Figure 6:
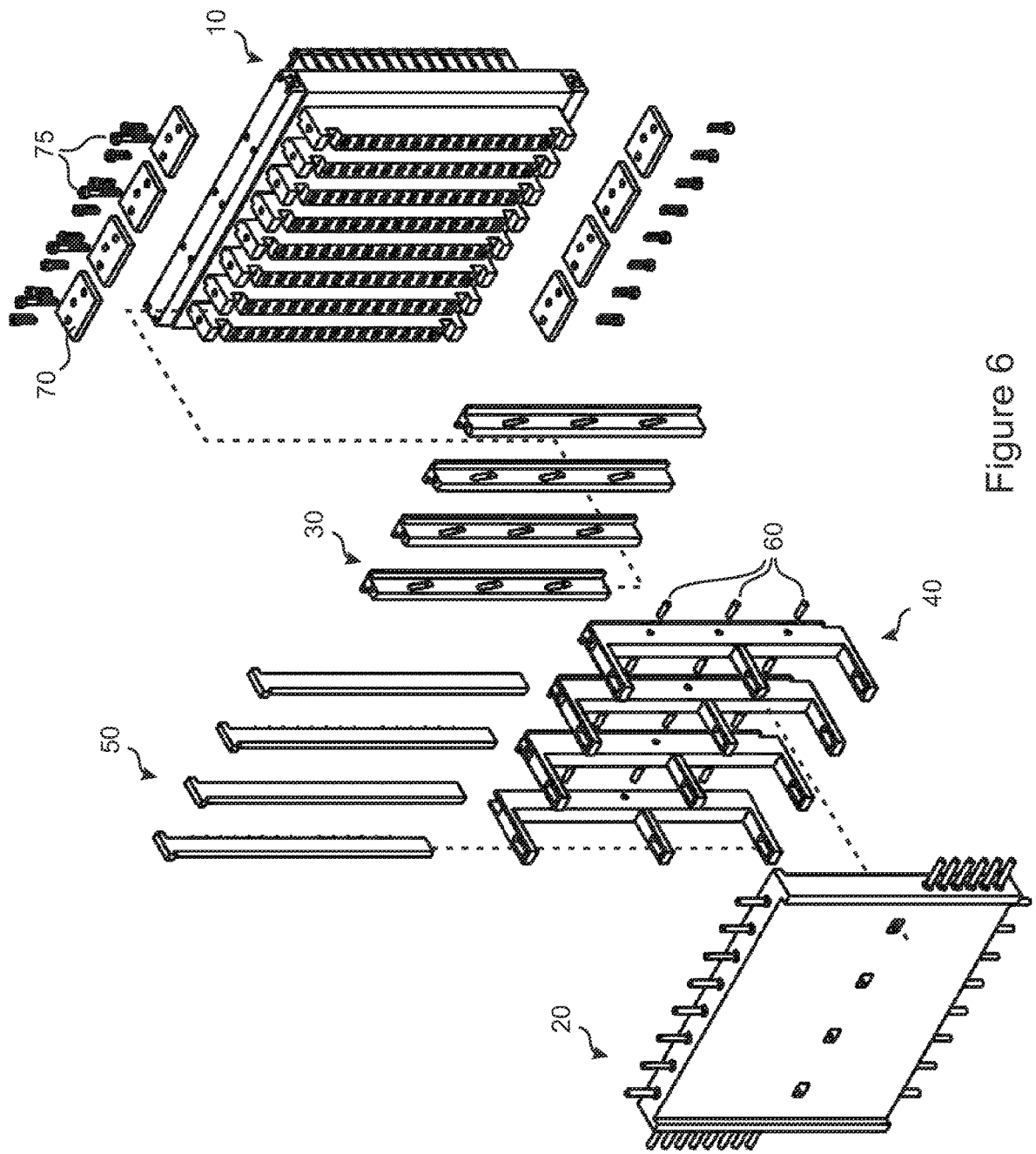
FIG. 6 shows a disassembled state of an exemplary valve setup or assembly.

FIG. 6 shows a disassembled state of an exemplary valve setup or assembly comprising: the valve control block 10, the plurality of sliding components 30, the plurality of brace components 40, the valve cassette block 20, the plurality of pins 60, a plurality of tensioning screws 75, a plurality of fixing plates 70 and the plurality of embracing yokes 50. These components may be assembled following various mounting sequences.

In one example, the valve cassette block 20 may be combined with the pulling brackets 40, 50 first. Then, the sliding components 30 may be joined to the pulling brackets 40, 50 with the pins 60. After that, all sliding components 30 may be inserted together into respective sliding trenches 14 of the valve control block 10. When the sliding components are completely inserted into the sliding trenches, the fixing plates 70 may be mounted to the valve control block.

There may be one fixing plate 70 provided for each inserted sliding component 30. Alternatively, one or more fixing plate 70 may be provided to cover multiple sliding trenches, each. The fixing plate(s) 70 may be fixed to the valve control block 10. In one example, the fixing plate(s) 70 may be secured to at least some of the control block banks 16 of the valve control block 10 via fixing screws.

As one function, the fixing plates 70 may close the sliding trenches to maintain the sliding components in the sliding trenches. As another function, the fixing plates may stabilize and fix the pulling brackets against movement along the sliding direction. To make further use of these functions, there may be fixing plate 70 (or other comparable structures) provided at both ends of each respective sliding trench. As yet another function, the fixing plates 70 may serves as abutting components for the tensioning screws 75, which can be inserted through respective holes in each fixing plate 70 to engage with respective threaded holes in the sliding components 30.

In another example of an assembly sequence, the brace components 40, e.g. without the embracing yokes 50 and without the valve cassette block 20, may be joined to the sliding components 30 with the pins 60 first. Then, the valve cassette block 20 may be embraced by the brace components 40 together with the embracing yokes 50. After that, the sliding components 30 may be interlocked with the valve control block 10, and the fixing plates 70 may be mounted. In any case, before operating the assembly, the tensioning screws 75 will be tightened as explained further below.

Specifically desirable, however, in yet another example, the brace components 40 (without the embracing yokes 50 and without the valve cassette block 20) may be joined to the sliding components 30 with the pins 60 first. Then, the sliding components 30 may be inserted into the sliding trenches 14 of the valve control block 10 and may be fixed by the fixing plates 70. Before the tensioning screws 75 are tightened, the valve control block may be inserted into the brace components 40 and secured by the embracing yokes 50. This last example may be specifically relevant when implementing at least the valve cassette block 20 as a single use component that may be exchanged after use, while other components in the assembly may be implemented as reusable. In such a case, exchanging the valve cassette block 20 would not require to completely disassemble the whole setup. It could be sufficient to just release the tensioning screws 75 and to pull out the embracing yokes 50 from the holes in the tension bars 42.

Figure 7:
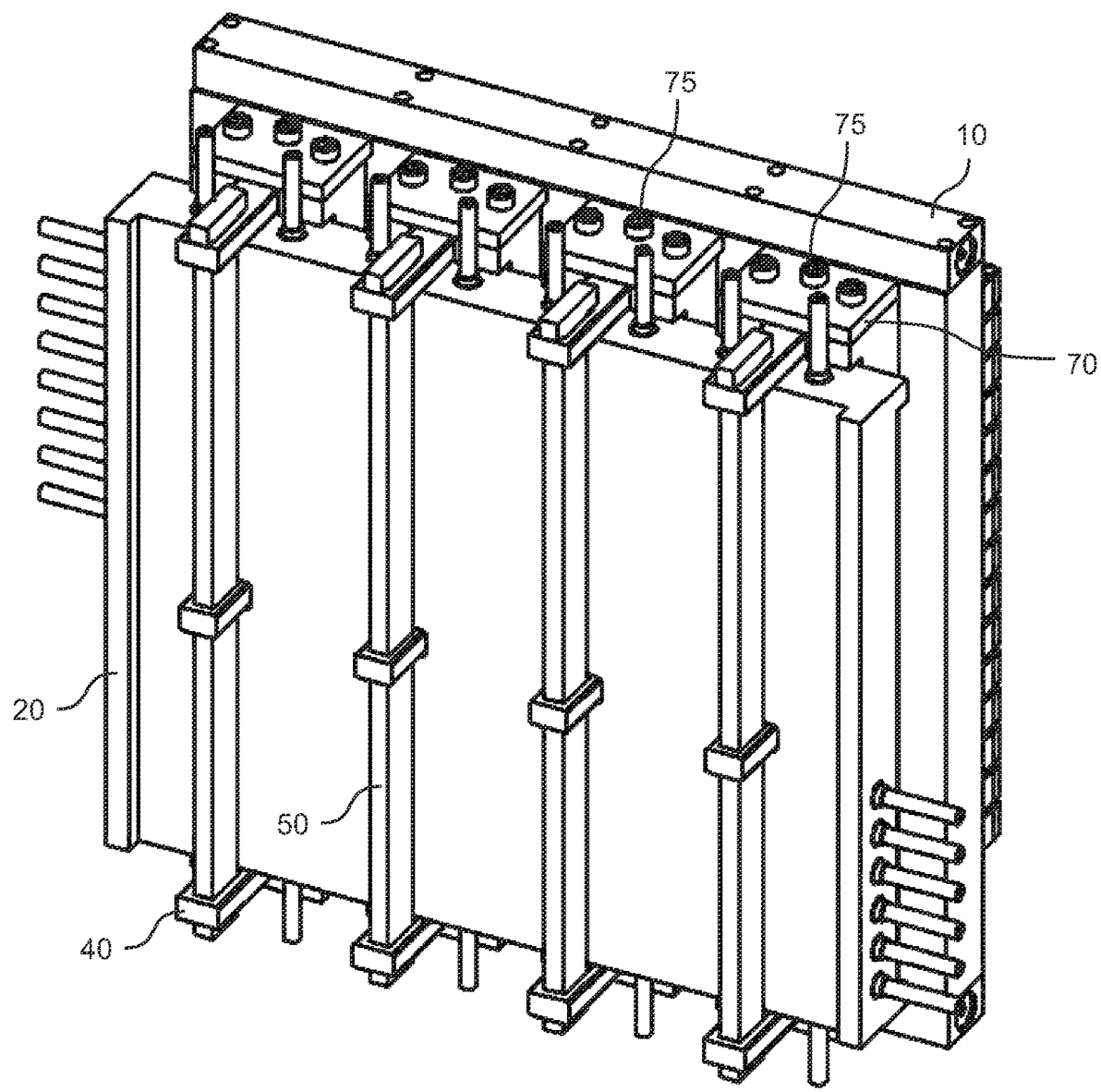
FIG. 7 shows an assembled state an exemplary valve setup or assembly.

FIG. 7 shows an assembled state of an exemplary valve setup or assembly. In the assembled state, each sliding component 30 is slidably interlocked with the valve control block 10 on one side and movably engaged with a respective brace component 40 on the other side. Each brace component 40, in turn, is movably engaged with the sliding component 30 on one side and, together with the embracing yoke 50, fixedly holds the valve cassette block 20. The valve cassette block 20 has its side comprising the valves (the control surface) facing the valve control block 10, namely the operation surface of the valve control block.

In particular, the ridge 34 of the sliding component 30 may be inside the bridge bar 41 of the brace component 40. In other words, the ridge 34 may be sandwiched between the side flange 45 of the slit 44 of the brace component 40. The ridge 34 and the bridge bar 41 from which it is enveloped may be located within the sliding trench 14 of the valve control block 10. As mentioned above, the interlocking part 32 of a sliding component 30 may fit the part of the sliding trench with which it engages so that the sliding component is slidable movable along the sliding direction (longitudinal extension of the sliding trenches) and fixed relative to the valve control block on other directions. Alternatively or additionally, the width of the ridge 34 plus the width of the side flange 45 may substantially coincide with the width of the sliding trench 14, so that no movement of the sliding component 30 and of the brace component 40 may occur perpendicular to the sliding direction and the pulling direction. Consequently, also movement of the valve cassette block 20 relative to the valve control block at least in a direction perpendicular to the sliding direction and to the pulling direction may thereby be efficiently prevented. Accordingly, the arrangement of the control elements 15 at the operation surface of the valve control block and the valves 25 at the control surface of the valve cassette block can be stably held relative to each other in at least a direction perpendicular to the sliding direction and to the pulling direction.

Moreover, the valve cassette block 20 and/or the valve control block 10 may comprise one or more positioning features configured to maintain the cassette subassembly fixed with respect to the sliding direction. This may be conducive to pressing the valve cassette block 20 against the valve control block 10. Further, it may contribute to correctly positioning of the valves 25 on the valve cassette block 20 in correspondence of the control elements 15 on the valve control block 10.

In one example, the valve cassette block 20 may have at least one protruding portion 22 on the side of the control surface, i.e. the side facing towards the valve control block 10 when assembled. Exemplarily, the at least one protruding portion 22 may span the whole width of the valve cassette block 20. In other examples, it may be shorter and/or may be discontinuous, e.g. be located only in correspondence of the control block banks 16. In the example shown in the figures, the valve cassette block 20 has two protruding portions 22, one at each edge of its surface.

The valve control block 10 may comprise grooves 12 as counterparts to the at least one protruding portion 22. The valve control block 10 may comprise at least one groove 12 into which the at least one protruding portion 22 is inserted. In other words, each control block bank 16 may comprise at least one groove 12 configured to receive the at least one protruding portion 22 of the valve cassette block 20. In particular, the dimensions of the groove may match those of the protruding portion 22. Accordingly, the insertion of the at least one protruding portion 22 in the at least one groove 12 in each of the control block banks 16 may support correct positioning and prevent relative movement of the valve cassette block and the valve control block relative to each other at least with respect to the sliding direction, in the assembled state. In the example shown in the figures (e.g. FIG. 2), each control block bank 16 has two grooves 12.

Figure 8C:
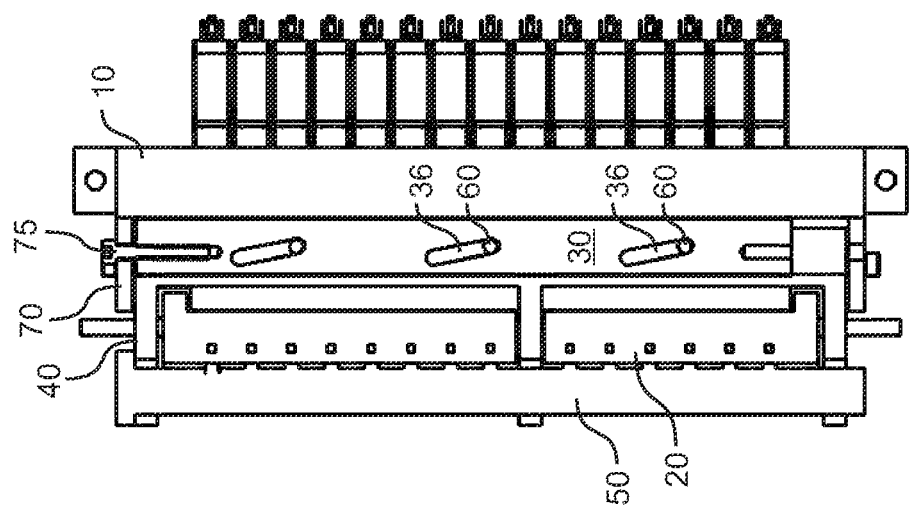
FIGS. 8a to 8c show an exemplary valve setup at different assembling and operating stages.
Figure 8B:
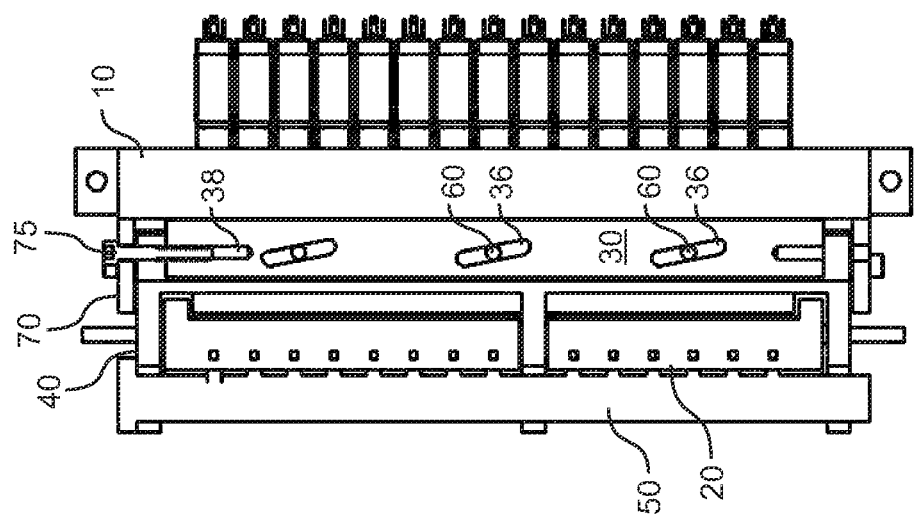
Figure 8A:
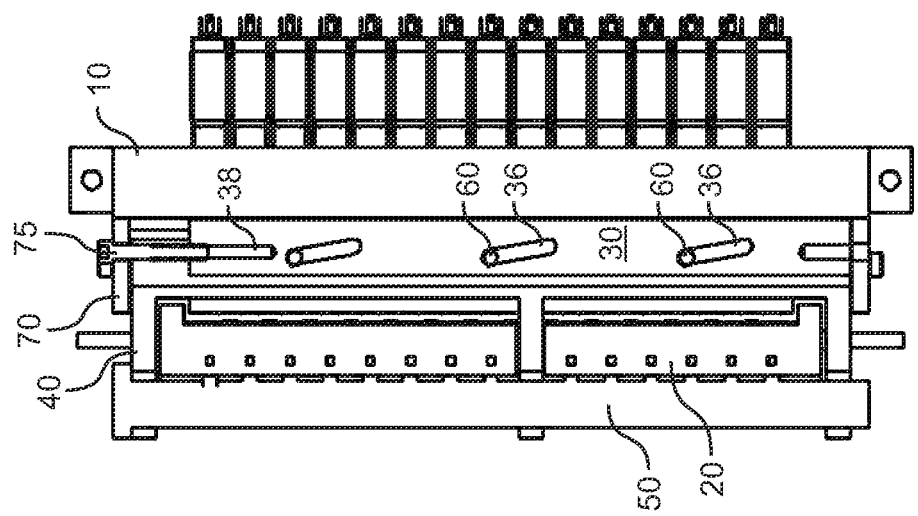

FIGS. 8a to 8c show a cross sectional view of an exemplary valve setup at different states during tightening the tensioning screws 75. The cross section corresponds to a sectional plane parallel to the sliding direction (vertical direction in FIGS. 8a-c) and the pulling direction (horizontal direction in FIGS. 8a-c).

FIG. 8a shows the cross sectionals view of the valve assembly in a stage, in which one tensioning screw 75 extending through a fixing plate 70 starts to be inserted in the threaded hole 38 of a sliding component 30. This is a fully released position of the tensioning screw and thereby causes a fully extended (initial) position of the valve cassette block relative to the valve control block. In this initial position, the control surface of the valve cassette block and the operation surface of the valve control block are not in contact with each other or at least not sufficiently pressed against each other as required for an operational state of the valves.

With the head of the tensioning screw 75 abutting the fixing plate 70, tightening the tensioning screw 75 causes the respective sliding component 30 to move along the sliding direction relative to the valve control block 10. More specifically, tightening the tensioning screw 75 pulls the sliding component 30 towards the fixing plate 70. As can be seen in the sequence of FIGS. 8a to 8c, the continued operation of the tensioning screw 75 causes the sliding component 30 to continuously slide along the sliding direction relative to the valve control block 10 (upwards in the sequence of the FIGS. 8a to 8c), from the initial state in FIG. 8a through an intermediate state in FIG. 8b to the final state in FIG. 8c, where the tensioning screw is fully tightened.

Since also the corresponding brace component 40 is prevented from movement along the sliding direction (vertical direction if FIGS. 8a-c), the movement of the sliding component in the sliding direction is also a movement relative to the brace component 40. The sliding component 30 and the brace component 40 are movably coupled via a tightening mechanism, which (in this example) is formed by the first and second through-slots 36, 46 together with the pins 60. As already explained, the tightening mechanism (via the slanted through-slot) translates a movement of the sliding component along the sliding direction into a movement of the brace component 40, and thus the pulling bracket together with the embraced valve cassette block in the pulling direction. In the sequence of the FIGS. 8a to 8c the valve control block is moved to the right, thereby bringing the control surface of the valve cassette block and the operation surface of the valve control block close to each other. The principle is the same when the first through-slots 36 are fitted through-slots and the second through-slots 46 are slanted through-slots.

In conclusion, it is possible to adequately press the valve cassette block 20 against the valve control block 10 to provide a functioning valve setup.

The above described method for installing the valve cassette block 20 (i.e. functionally connecting it to the valve control block 10) is simple, intuitive and requires minimal effort. In particular, the time for assembly and specifically for replacing the valve cassette block is significantly reduced with respect to a conventional method in which screws are directly used to fix the valve cassette block 20 to the valve control block 10. Also, the number of components is significantly reduced, e.g. from 64 screws to 4 fasteners or screws (one for each sliding component), as in the example discussed above, and no torque wrench is required. Further, compared with a hydraulic mounting systems, the cost and complexity of the method are greatly reduced. Finally, any assembling errors are easy to spot, so operator errors are virtually eliminated.

The invention claimed is:

1. An assembly comprising:
   at least one valve cassette block comprising a plurality of valves which are controllable via a control surface of the valve cassette block;
   a valve control block having an operation surface, the valve control block being configured to control each of the plurality of valves when the operation surface is in close contact with the control surface of the at least one valve cassette block, the valve control block comprising at least one sliding trench formed in the operation surface;
   at least one sliding component configured to slidably interlock with the at least one sliding trench such that the at least one sliding component is movable relative to the valve control block in a sliding direction parallel to the operation surface,
   at least one pulling bracket configured to embrace the at least one valve cassette block and to interact with the at least one sliding component such that a sliding movement of the at least one sliding component in the at least one sliding trench causes the pulling bracket to pull the at least one valve cassette block with its control surface against the operation surface of the valve control block.

2. The assembly according to claim 1, wherein the valve control block comprises a plurality of sliding trenches formed in the operation surface, and wherein the assembly comprises
   a plurality of sliding components each being configured to slidably interlock with a respective sliding trench; and
   a plurality of pulling brackets each being configured to embrace the at least one valve cassette block and to interact with a respective one of the sliding components such that a sliding movement of the respective sliding component in the respective sliding trench causes the respective pulling bracket to pull the valve cassette block with its control surface against the operation surface of the valve control block.

3. The assembly according to claim 2, wherein the sliding trenches of the plurality of sliding trenches are formed parallel and equidistant to each other.

4. The assembly according to claim 1, wherein the at least one sliding component comprises two lateral shoulders wherein the shoulders are adapted to engage with respective undercut recesses formed in the respective sliding trench of the valve control block.

5. The assembly according to claim 1, wherein the at least one sliding component comprises a ridge, wherein the ridge includes part of a tightening mechanism that implements an interaction between the sliding component and the pulling bracket such that a sliding movement of the sliding component in the sliding trench along the sliding direction causes the pulling bracket to pull the valve cassette block with its control surface against the operation surface of the valve control block.

6. The assembly according to claim 5, wherein the at least one pulling bracket comprises a U-beam which is configured to at least partly accommodate the ridge of the respective sliding component and which includes a complementary part of said tightening mechanism that implements said interaction between the sliding component and the pulling bracket.

7. The assembly according to claim 6, wherein the tightening mechanism is implemented such that one of the sliding component and the pulling bracket includes a gliding surface slanted relative to the sliding direction, while the other of the sliding component and the pulling bracket includes or accommodates an abutting element to glide abut the slanted gliding surface.

8. The assembly according to claim 7, wherein the gliding surface is formed by at least one transverse elongated hole and the abutting element comprise at least one pin adapted to extend through said at least one elongated hole.

9. The assembly according to claim 1, further comprising a tensioning screw to control a forced sliding movement of the sliding component relative to the valve control block, when the pulling bracket interacts with the sliding component, thereby causing the operation surface of the valve control block embraced by said pulling bracket to be tightly pulled against the control surface of the valve cassette block.

10. The assembly according to claim 1, wherein the at least one pulling bracket comprises
    a bridge bar configured to be engaged with the at least one sliding component;
    a plurality of tension bars connected with first ends thereof to the bridge bar and extending perpendicular to the bridge bar and substantially parallel to each other; and
    an embracing yoke removably attachable to second ends of the plurality of tension bars, thereby connecting said ends of the tension bars.

11. The assembly according to claim 10, wherein the at least one pulling bracket comprises at least two tension bars, and wherein the at least one valve cassette block comprises at least one embracing through-slot extending through the control surface to an opposite side of the valve cassette block such that at least one of the at least two tension bars extends through the embracing through-slot when the pulling bracket embraces the valve cassette block.

12. The assembly according to claim 1, further comprising a displacement prevention structure that prevents relative movement of the valve cassette block and the valve control block with respect to each other in at least the sliding direction when the control surface and the operation surface face or touch each other.

13. A method for assembling a valve setup, the method comprising:
    providing at least one valve cassette block comprising a plurality of valves which are controllable via a control surface of the valve cassette block;
    providing a valve control block having an operation surface, the valve control block being configured to control each of the plurality of valves when the operation surface is in contact with the control surface of the at least one valve cassette block;
    slidably interlocking at least one sliding component with at least one sliding trench formed in the operation surface of the valve control block such that the at least one sliding component is movable relative to the valve control block in a sliding direction parallel to the operation surface;
    embracing the at least one valve cassette block with at least one pulling bracket;
    engaging the at least one pulling bracket with the at least one sliding component such that a movement of the at least one sliding component in the at least one sliding trench causes the at least one pulling bracket to pull the at least one valve cassette block with its control surface against the operation surface of the valve control block;

tightening the valve setup by sliding the at least one sliding component in the at least one sliding trench such as to cause the at least one valve cassette block with its control surface to be pulled against the operation surface of the valve control block.

\* \* \* \* \*